United States Patent
Zhang et al.

(10) Patent No.: US 8,925,210 B2
(45) Date of Patent: Jan. 6, 2015

(54) DIGITAL MARKING GAUGE

(71) Applicants: Yanchen Zhang, San Clemente, CA (US); Meng Zhang, San Clemente, CA (US)

(72) Inventors: Yanchen Zhang, San Clemente, CA (US); Meng Zhang, San Clemente, CA (US)

( * ) Notice: Subject to any disclaimer, the term of this patent is extended or adjusted under 35 U.S.C. 154(b) by 0 days.

(21) Appl. No.: 13/736,949

(22) Filed: Jan. 9, 2013

(65) Prior Publication Data

US 2014/0190024 A1  Jul. 10, 2014

(51) Int. Cl.
  *B43L 9/04*  (2006.01)
  *B43L 13/00*  (2006.01)
  *B25H 7/00*  (2006.01)
  *G01B 3/20*  (2006.01)

(52) U.S. Cl.
  CPC . *B25H 7/00* (2013.01); *G01B 3/205* (2013.01)
  USPC .............................. 33/32.1; 33/41.1; 33/27.03

(58) Field of Classification Search
  USPC ................ 33/27.01, 27.02, 27.03, 32.1, 32.2, 33/32.3, 41.1, 41.6, 42, 197
  See application file for complete search history.

(56) References Cited

U.S. PATENT DOCUMENTS

| | | | | |
|---|---|---|---|---|
| 4,315,371 A * | 2/1982 | Kotani et al. | ................... | 33/32.3 |
| 5,471,753 A * | 12/1995 | Rodrigues | .......................... | 33/42 |
| 6,604,289 B2 * | 8/2003 | Nikolov | ....................... | 33/27.03 |
| 8,522,445 B1 * | 9/2013 | Scribante | .......................... | 33/42 |
| 2007/0163130 A1 * | 7/2007 | Kyoung-Soo | ..................... | 33/42 |
| 2007/0240317 A1 * | 10/2007 | Nicholson | ..................... | 33/32.3 |

\* cited by examiner

*Primary Examiner* — G. Bradley Bennett
(74) *Attorney, Agent, or Firm* — Let Z. Kwan, Esq.

(57) ABSTRACT

The current marking gauges, mortise gauges and circle marking gauges on the market require use of a ruler to measure distances prior to marking, which is inconvenient and time consuming. Moreover, the accuracy of the marked dimension is inexact due to the low accuracy of using a ruler. Furthermore, parallax error created by transferring the measured distance between the rule and the gauges also needs to be accounted for, which reduces accuracy even further. This present invention helps to improve the accuracy of the measurement and marking of the gauges, increases efficiency, convenience, saves time and is easy to use. The new product is a digital multifunctional marking gauge, that includes a Digital Unit, Main Slider, Beam, Display, Fixed Pin, Adjustable Pin, Adjustment Slider, Fence, Calibration Frame, Calibration bar, Setting Block, Scriber, Set function button of the Digital Unit, Locking Screw, Fixing Screws and related components.

18 Claims, 6 Drawing Sheets

DIGITAL MARKING GAUGE

PRIORITY DATE

Applicants claim priority date of Jan. 14, 2012 based on provisional filing date of Jan. 14, 2012. (Provisional Application No. 61/586,770)

BACKGROUND OF THE INVENTION

1. Field of the Invention

The present invention relates generally to tools of precision measurement and related tools within the trade, and more particularly to a Digital Marking Gauge. The current use of the marking gauge, mortise gauge and divider require the use of a ruler or similar measuring instruments to measure distances first, before make a desired marking. This process is very inconvenient and time consuming. Moreover, the accuracy of the marked dimension is inexact since the accuracy of a ruler is low. Furthermore, parallax error created by transferring the measured distance between the rule and the gauges also needs to be accounted for, which reduces accuracy even further.

This present invention helps to improve the accuracy of the measurement and marking of the gauges. At the same time, use of the present invention increases efficiency, convenience, and is time-saving, and easy to use.

2. Brief Description of the Related Art

The field of measurements and specifically to marking gauges as used by such persons as drafters, contractors, artisans, architects machinists, etc. are used on a daily basis. Tools for providing accurate measurements of lengths, widths, diameters, heights and their resulting marking are absolutely necessary for the completion of jobs in these industries.

Contractors, machinists and architects however, must carry a large amount of other tools and supplies with them during jobs to perform necessary tasks. Any of these persons would be enabled to perform their duties more efficiently if measurements are done more rapidly with increased accuracy, thereby lessening fatigue and thereby increasing work quality.

What is needed in the art is a digital marking gauge that allows users to make measurement much faster and more accurately as compared with a wide variety of marking gauges that are on the market today. The present invention satisfies those needs.

SUMMARY OF THE INVENTION

The field of measurements and specifically to marking gauges as used by such persons as drafters, contractors, artisans, architects machinists, etc. are used on a daily basis. Tools for providing accurate measurements of lengths, widths, diameters, heights and their resulting marking are absolutely necessary for the completion of jobs in these industries.

Contractors, machinists and architects however, must carry a large amount of other tools and supplies with them during jobs to perform necessary tasks. Any of these persons would be enabled to perform their duties more efficiently if measurements are done more rapidly with increased accuracy, thereby lessening fatigue and thereby increasing work quality.

What is needed in the art is a digital marking gauge that allows users to make measurement much faster and more accurately as compared with a wide variety of marking gauges that are on the market today. The present invention satisfies those needs.

The disadvantages and limitation of the conventional marking gauges are overcome by an explanation of use of the present invention.

The new product is a type of digital multifunctional marking gauge, that include a Digital Unit (1), Main Slider (2), Beam (3), Display (17), Fixed Pin (12), Adjustable Pin (9), Adjustment Slider (10), Fence (5), Calibration Frame (6), Calibration Bar (8), Setting Block (22), Scriber (23), Set function button of the Digital Unit (20), Locking Screw for Adjustment slider (11) and Locking Screw for Main Slider (24), Fixing Screws A (4), Fixing Screws B (7), Fixing Screws C (13) and Fixing Screws D (21), and other related parts. Other related parts include components such as marking wheels, adjustable marking wheels, digital wheel marking gauge, digital wheel mortise marking gauge, and other related parts.

As a Digital Marking Gauge/Cutting Gauge:

To use the invention as a make a single parallel line marking, take off the Adjustment Slider (10) from Beam (3), move the Main Slider (2) toward the Fixed Pin (12) until it touches the Fixed Pin (12). At this position, make the contact between Fixed Pin (12) and Calibration Bar (8) as close as possible, hold it tightly, push Set function button on the Display Unit (20) to set zero.

To make a parallel marking measurement, move the Main Slider (2), Display shows the desired marking dimension. Put the Fence (5) firmly against the edge of a wood or a metal plate. Move the marking gauge along the plate edge with Fixed Pin (12) contacting the plate surface to make a parallel linear marking. By changing the Fixed Pin (12) to an industry standard Marking Knife, the gauge can function as a cutting gauge.

As a Digital Mortise Marking Gauge:

To use the invention as a mortise marking gauge, set the gauge to zero utilizing the same process as indicated above for the marking gauge. By knowing the position of the mortise and marking dimension, push the Fence (5) against the edge of a wood piece and move the Fixed Pin (12) until the Display (17) shows the desired measurement value. The Fixed Pin (12) position represents the far line of the mortise relative to the wood's edge. Use the Locking Screw for Main Slider (24) to lock the Fence's (5) position. Add the Adjustment Slider (10) with Adjustable Pin (9) on the Beam (3) at a position between the Fixed Pin (12) and the Main Slider (2). Put the blade edge of the mortise chisel between the two point's center of the Fixed Pin (12) and Adjustable Pin (9); lock the position of the Adjustment Slider (10) by locking screw for Adjustment Slider (11) firmly. Put the Fence (5) at the edge of the wood, and then make a mortise marking along the edge of the wood with Fixed Pin (12) and Adjustable Pin (9) contacting the wood surface.

To Make Circle Marking:

To use the invention to make a circle shape marking, take off Fence (5) and Adjustment Slider (10) from the Beam (3). With Scriber (23) pre-installed on the Setting Block (22), install Setting Block (22) onto the Main Slider (2) using the Fixing Screws for Setting Block (21). Move the Fixed Pin (12) close to the edge of the Setting Block (22) to set desired figure by pressing Set button on the Display Unit (20). The Digital Display (17) will not display zero since there is a constant length between the center of Fixed Pin (12) and Scriber (23). Move the Main Slider (2) to a desired radius size (making sure the constant size is calculated within the radius size). Hold down the Fixed Pin (12) as the center; make a circle marking by moving the Main Slider (2) with Scriber (23) contacting the surface of the object to be marked.

When using preset programmed digital unit in which the unit has a preset function, start by moving Fixed Pin (12) close to the edge of the Setting Block (22), press the Set button (20) on the Display Unit, the display shows the exact absolute dimension between the center of the Fixed Pin (12) and Scriber (23).

The new product using a high accuracy moving censer with display reading to 0.0005" accuracy to 0.001" per 6". It has inch/metric 2 ways or inch/metric/inch fraction 3 ways reading function that it is easy to read, accurate, efficient, simple, and digitalized.

With this invention, a user can measure an object much more quickly than any conventional outside micrometer. At the same time, the present invention measures work without loss of accuracy. The present invention incorporates the use of linear spindle motion thereby enabling a much faster and more precise travel from the distance of one end to the distance of the second end of the work being measured as compared with conventional rotary thread spindle motion micrometers that exist on the market today.

BRIEF DESCRIPTION OF THE DRAWINGS

FIG. 1 is a perspective view of a first embodiment of a digital multifunctional marking gauge according to the present invention.

FIG. 2 is a perspective view of a second embodiment of a digital multifunctional marking gauge according to the present invention.

FIG. 3 is a front and back perspective view of a first embodiment of a digital multifunctional marking gauge according to the present invention.

FIG. 4 is a front and back perspective view of a second embodiment of a digital multifunctional marking gauge according to the present invention.

FIG. 5 are multiple views of a second embodiment of a digital multifunctional marking gauge according to the present invention.

FIG. 6 are multiple views of a first embodiment of a digital multifunctional marking gauge according to the present invention.

DESCRIPTION OF PREFERRED EMBODIMENTS

Figure 1:
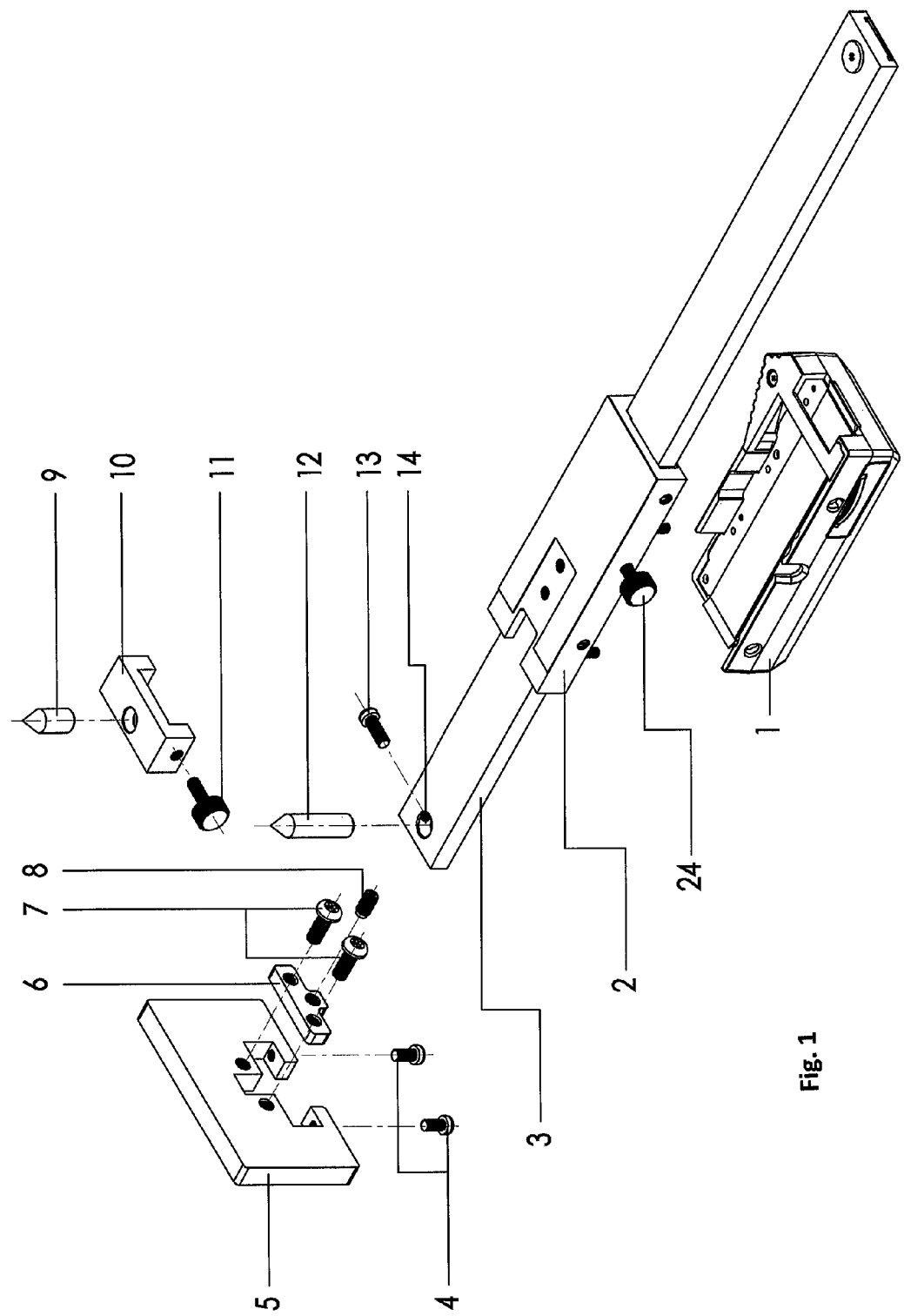
FIG. 1-FIG. 6 is illustrated including the following components:
1. Digital Unit
2. Main Slider
3. Beam
4. Fixing Screw for Fence
5. Fence
6. Calibration Frame
7. Fixing Screw for Calibration Frame
8. Calibration Bar
9. Adjustable Pin
10. Adjustment Slider
11. Locking Screw for Adjustment Slider
12. Fixed Pin
13. Fixing Screw for Fixed Pin
14. Position Hole of Fixed Pin
15. Fixing Hole A for Calibration Block
16. Fixing Hole B for Calibration Block
17. Digital Display
18. On/OFF Button
19. Inch/Metric/Inch Fraction Button
20. Set function button on Display Unit
21. Fixing Screws for Setting Block
22. Setting Block
23. Scriber
24. Locking Screw for Main Slider The drawings illustrate generally, by way of example, various embodiments discussed in the present document. The drawings are for illustrative purposes only and may not be to scale.
Figure 2:
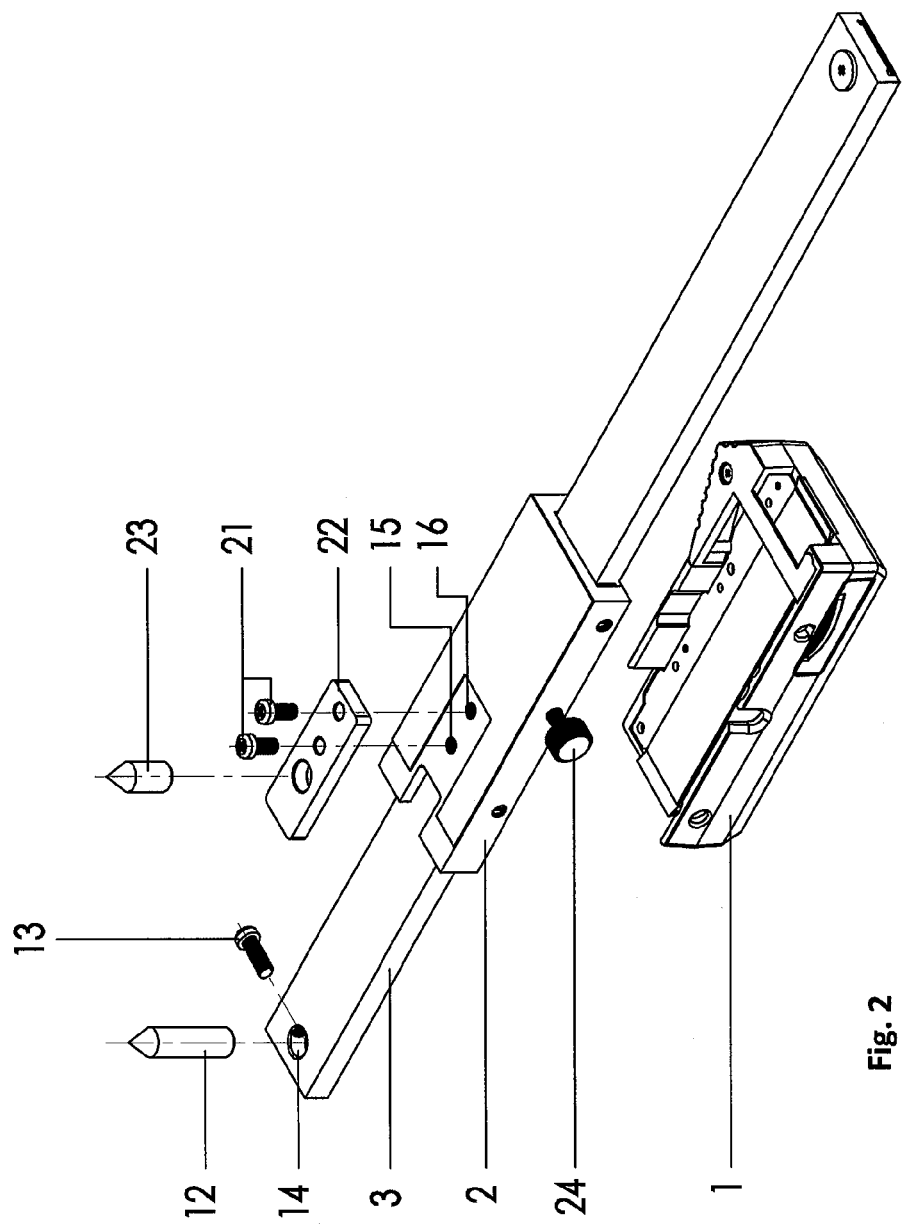
Figure 3:
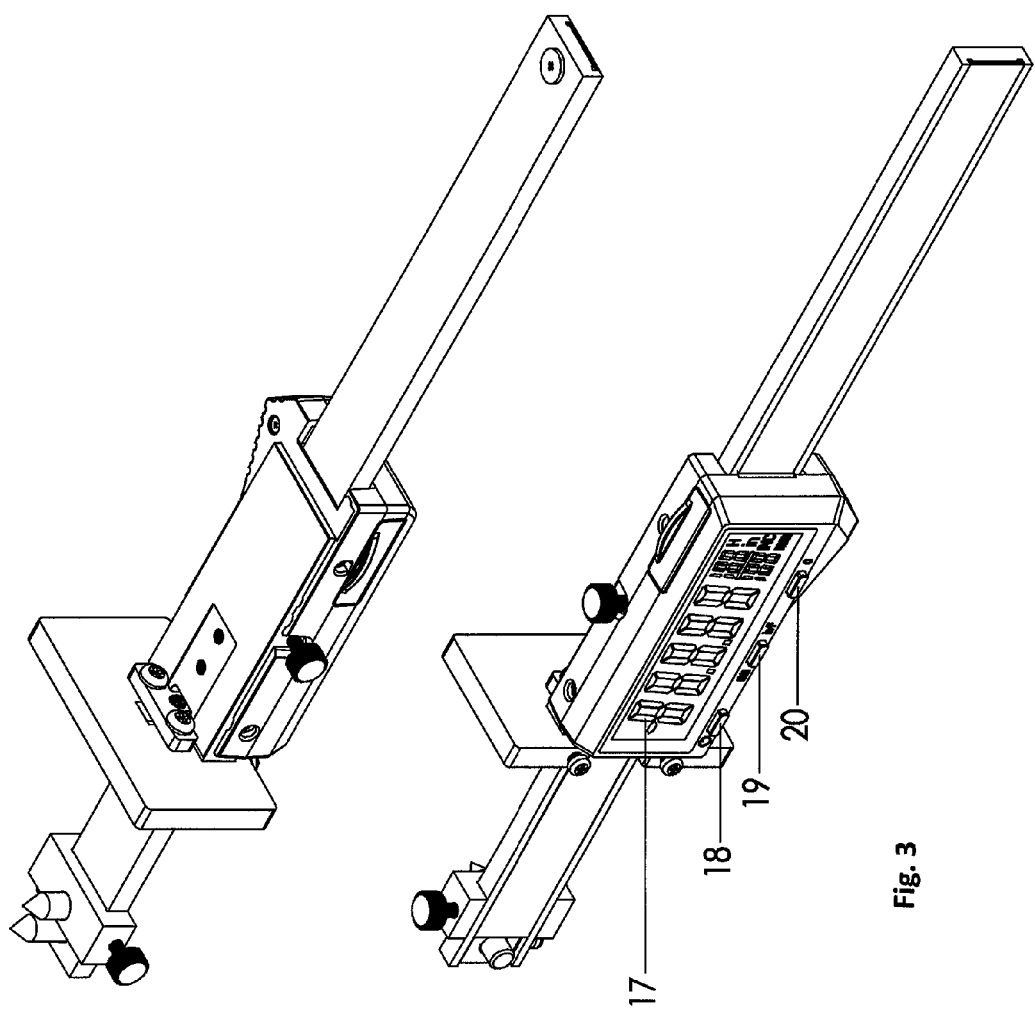
Figure 4:
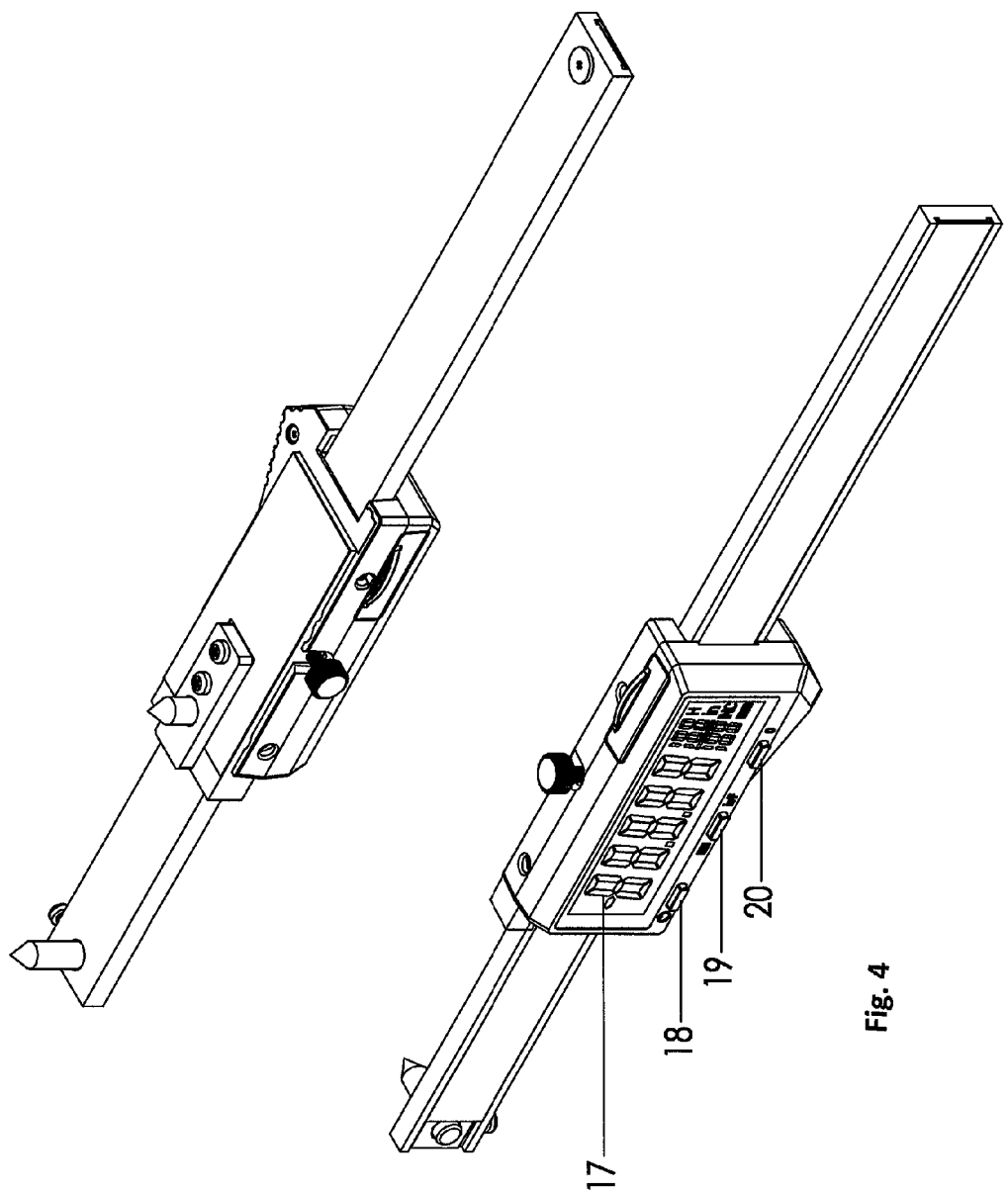
Figure 5:
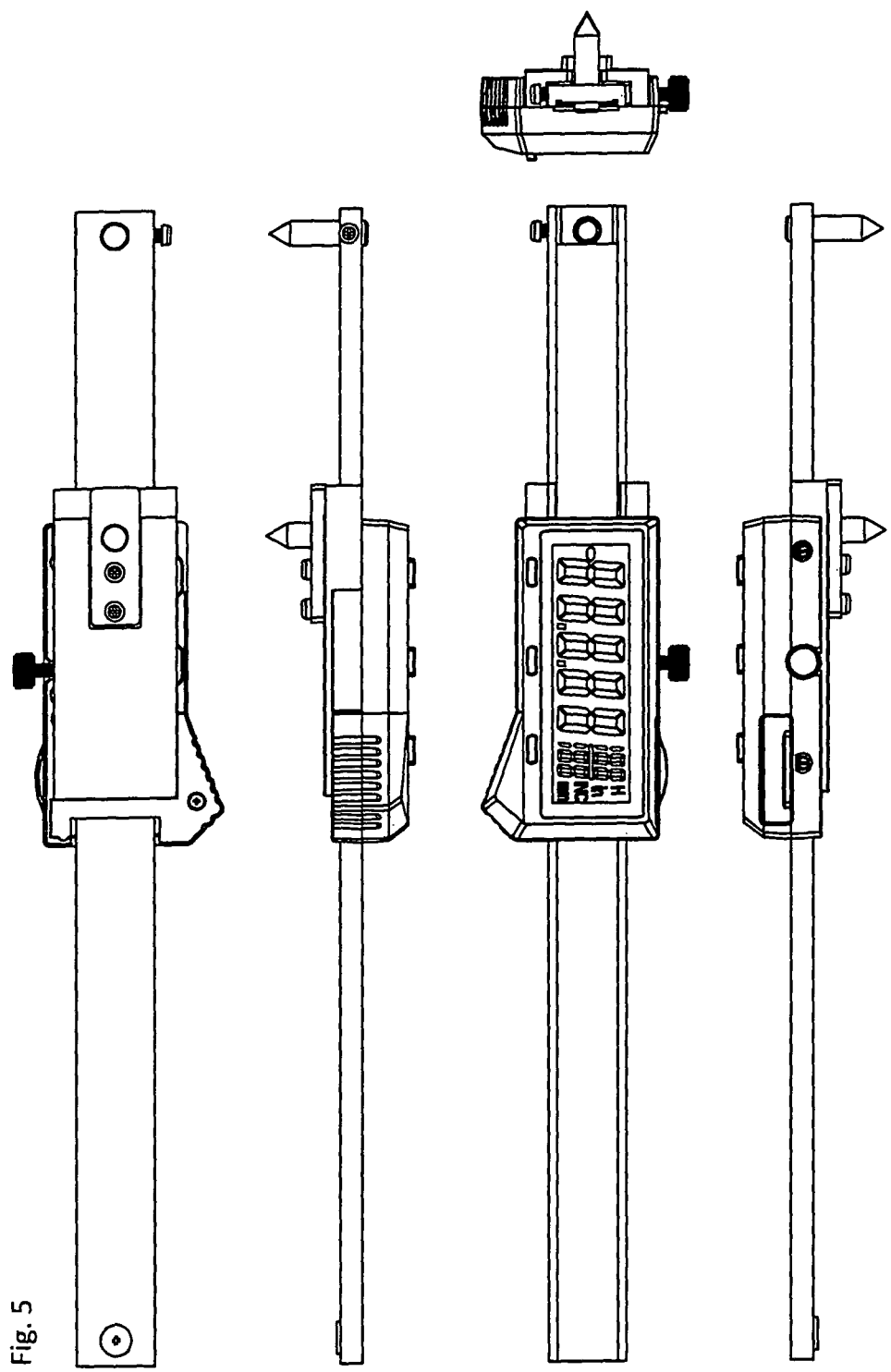
Figure 6:
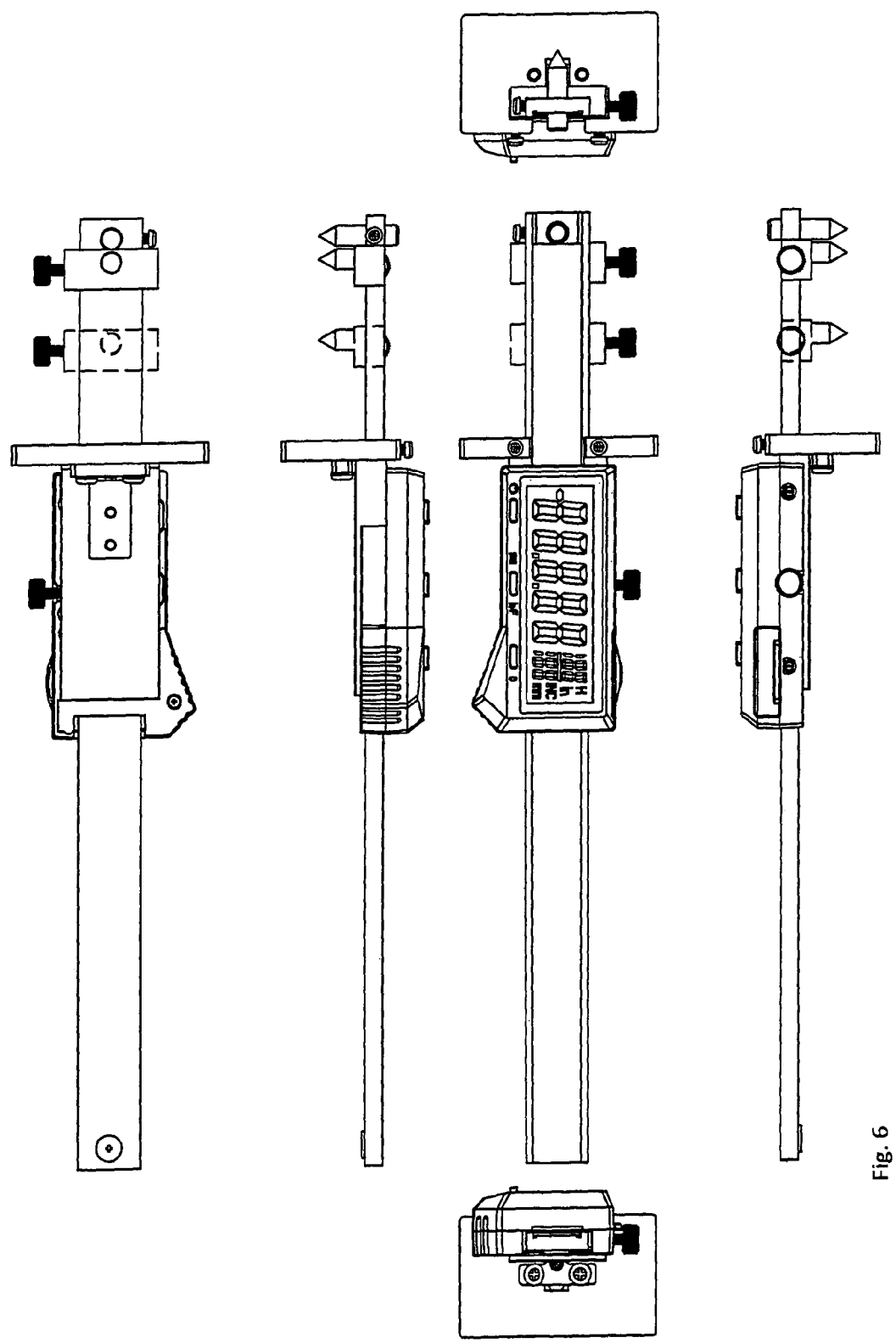

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner. Referring to the drawing figures, like reference numerals designate identical or corresponding elements throughout the several figures. As shown and described in FIG. 1 through FIG. 6.

According to principles of the present invention, the present invention is as follows:

The new product is a new type of digital multifunctional marking gauge, that include a Digital Unit (1), Main Slider (2), Beam (3), Display (17), Fixed Pin (12), Adjustable Pin (9), Adjustment Slider (10), Fence (5), Calibration Frame (6), Calibration bar (8), Setting Block (22), Scriber (23), Set function button of the Digital Unit (20), Locking Screw for Adjustment Slider (11) and Locking Screw for Main Slider (24), Fixing Screws for Fence (4), Fixing Screws for Calibration Frame (7), Fixing Screws for Fixed Pin (13) and Fixing Screws for Setting Block (21), and other related parts described herein.

As a Digital Marking Gauge/Cutting Gauge:

To use the invention as a make a single parallel line marking, take off the Adjustment Slider (10) from Beam (3), move the Main Slider (2) toward the Fixed Pin (12) until it touches the Fixed Pin (12). At this position, make the contact between Fixed Pin (12) and Calibration Bar (8) as close as possible, hold it tightly, push Set function button on the Display Unit (20) to set zero.

To make a parallel marking measurement, move the Main Slider (2), Display shows the desired marking dimension. Put the Fence (5) firmly against the edge of a wood or a metal plate. Move the marking gauge along the plate edge with Fixed Pin (12) contacting the plate surface to make a parallel linear marking. By changing the Fixed Pin (12) to an industry standard Marking Knife, the gauge can function as a cutting gauge.

As a Digital Mortise Marking Gauge:

To use the invention as a mortise marking gauge, set the gauge to zero utilizing the same process as indicated above for the marking gauge. By knowing the position of the mortise and marking dimension, push the Fence (5) against the edge of a wood piece and move the Fixed Pin (12) until the Display (17) shows the desired measurement value. The Fixed Pin (12) position represents the far line of the mortise relative to the wood's edge. Use the Locking Screw for Main Slider (24) to lock the Fence's (5) position. Add the Adjustment Slider (10) with Adjustable Pin (9) on the Beam (3) at a position between the Fixed Pin (12) and the Main Slider (2). Put the blade edge of the mortise chisel between the two point's center of the Fixed Pin (12) and Adjustable Pin (9); lock the position of the Adjustment Slider (10) by locking screw for Adjustment Slider (11) firmly. Put the Fence (5) at the edge of the wood, and then make a mortise marking along the edge of the wood with Fixed Pin (12) and Adjustable Pin (9) contacting the wood surface.

To Make Circle Marking:

To use the invention to make a circle shape marking, take off Fence (5) and Adjustment Slider (10) from the Beam (3). With Scriber (23) pre-installed on the Setting Block (22), install Setting Block (22) onto the Main Slider (2) using the Fixing Screws for Setting Block (21). Move the Fixed Pin (12) close to the edge of the Setting Block (22) to set desired figure by pressing Set button on the Display Unit (20). The Digital Display (17) will not display zero since there is a constant length between the center of Fixed Pin (12) and Scriber (23). Move the Main Slider (2) to a desired radius size (making sure the constant size is calculated within the radius size). Hold down the Fixed Pin (12) as the center; make a circle marking by moving the Main Slider (2) with Scriber (23) contacting the surface of the object to be marked.

When using preset programmed digital unit in which the unit has a preset function, start by moving Fixed Pin (12) close to the edge of the Setting Block (22), press the Set button (20) on the Display Unit, the display shows the exact absolute dimension between the center of the Fixed Pin (12) and Scriber (23).

Use of the new invention provides for a high accuracy moving sensor with display reading of accuracy up to 0.0005", and accuracy to 0.001" per 6". It has inch/metric 2 ways or inch/metric/inch fraction 3 ways reading function, and use of the invention is easy to read, accurate, efficient, simple, and digitalized.

Still other objects, features, and attendant advantages of the present invention will become apparent to those skilled in the art from a reading of the detailed description of embodiments herein, constructed in accordance therewith, taken in conjunction with the accompanying drawings.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention described by the foregoing includes all changes that come within the meaning, range and equivalence thereof and is intended to be embraced therein.

The invention claimed is:

1. A digital multifunctional marking gauge comprising: a digital unit, a main slider, a beam, a fixed pin, a fixing screw for said fixed pin, an adjustable pin, an adjustment slider, a locking screw for said adjustment slider, a fence, a calibration frame, a calibration bar, a set of fixing screws, a setting block, a fixing screw for said setting block, a scriber, a set button of said digital unit, a locking screw for said main slider; wherein said fixed pin is coupled to said beam with said fixing screw for said fixed pin; wherein said adjustable pin is coupled to said adjustment slider with said locking screw for said adjustment slider; wherein said scriber is coupled to said setting block; wherein said setting block is coupled via said fixing screw for said setting block on said beam; wherein said calibration frame is fixed onto said fence via said set of fixing screws onto said calibration frame; wherein said calibration bar is affixed on said calibration frame; wherein a distance between a front edge of said calibration bar and an opposing side of said fence from said calibration bar is measured and is a distance equal to the radius of said fixed pin.

2. The digital multifunctional marking gauge of claim 1, further comprising an additional feature wherein said adjustable pin is affixed on said adjustment slider, wherein said adjustment slider is affixed on said beam at any position between said fixed pin and said main slider; wherein said adjustment slider is held in place by said locking screw for said adjustment slider on said beam.

3. The digital multifunctional marking gauge of claim 2, further comprising an additional feature wherein said fence is attachable from said main slider; wherein said fence is removable from said main slider.

4. The digital multifunction marking gauge of claim 3 further comprising an additional feature whereby said main slider is moved to contact said fixed pin, at a position wherein said fixed pin is in contact with said calibration bar on said fence.

5. The digital multifunction marking gauge of claim 4 further comprising an additional feature whereby absolute zero is set by pressing set button of said digital unit.

6. The digital multifunction marking gauge of claim 5 further comprising an additional feature whereby said setting block is attachable and removable from said main slider.

7. The digital multifunction marking gauge of claim 6 further comprising an additional feature whereby movement of said main slider to direction toward said fixed pin causes distance readout to be displayed on said display unit; wherein movement of said main slider to direction away from said fixed pin causes distance readout to be displayed on a digital display of said digital unit.

8. The digital multifunction marking gauge of claim 7 further comprising an additional feature whereby movement of said main slider is held in place by said locking screw for said main slider; wherein said main slider is locked into place at any position on said beam.

9. The digital multifunction marking gauge of claim 8, further comprising an additional feature whereby settings and resulting said distance readout to be displayed on said digital display of said digital unit is capable to be switched; wherein said settings can be switched between inch increments on said digital display of said digital unit; wherein said settings can be switched between metric increments on said digital display of said digital unit; wherein said settings can be switched between inch metric increments on said digital display of said digital unit; wherein said settings can be switched to inch fraction increments on said digital display of said digital unit.

10. The digital multifunction marking gauge of claim 9, further comprising an additional feature whereby said fence is attachable and removable from the Main Slider.

11. The digital multifunctional marking gauge of claim 10 further comprising an additional feature wherein said fixed pin is replaced with a marking wheel fixed on said front end of said beam.

12. The digital multifunctional marking gauge of claim 11 further comprising an additional feature wherein said marking wheel is a set of adjustable marking wheels on said front end of said beam; wherein said set of adjustable marking wheels is attached on said front portion of said fence.

13. The digital multifunctional marking gauge of claim 12 further comprising an additional feature wherein said set of adjustable marking wheels at said front end of said beam, provides for an additional feature of a digital wheel marking gauge.

14. The digital multifunctional marking gauge of claim 13 further comprising an additional feature wherein said set of adjustable marking wheels is attached on said front portion of said fence, further comprising an additional feature of a digital wheel mortise marking gauge.

15. The digital multifunction marking gauge of claim 10, further comprising an additional feature whereby said scriber is attachable and removable from said setting block.

16. The digital marking gauge of claim 15, further comprising an additional feature of a cutting gauge.

17. The digital marking gauge of claim 16, further comprising an additional feature of a digital mortise marking gauge.

18. The digital marking gauge of claim 17, further comprising an additional feature of a circle marking gauge.

* * * * *